United States Patent [19]

Beasley

[11] Patent Number: 4,888,742
[45] Date of Patent: Dec. 19, 1989

[54] METHOD OF MIGRATING SEISMIC DATA

[75] Inventor: Craig J. Beasley, Houston, Tex.

[73] Assignee: Western Atlas International, Inc., Houston, Tex.

[21] Appl. No.: 116,388

[22] Filed: Nov. 3, 1987

[51] Int. Cl.$^4$ .............................................. G01V 1/36
[52] U.S. Cl. ...................................... 367/53; 367/50; 367/51
[58] Field of Search ........................... 367/50, 51, 53; 364/421

[56] References Cited

PUBLICATIONS

"Migration by Fourier Transformation", R. H. Stolt, Geophysics, Vol. 43, #1, 1978.
Larner, K. and Beasley, C., 1986, Cascaded Migrations: *A Way of Improving the Accuracy of Finite-Difference Migration;* 55th Annual Meeting S.E.G., Washington, D.C., 70 pages.
Beasley et al., *Cascaded Frequency-Wavenumber (f-k) Migration:* 57 Annual S.E.G. International Meeting, New Orleans, Louisiana, 33 pages.
Beasley, C., 1987, *Migration in Stages;* Abstract presented at the Geophysical Imaging Symposium, Tulsa, Oklahoma.

*Primary Examiner*—Thomas H. Tarcza
*Assistant Examiner*—Ian J. Lobo
*Attorney, Agent, or Firm*—Barry C. Kane

[57] ABSTRACT

A method for migrating seismic data in the frequency-wave number domain is provided for migrating the seismic data having large vertical and lateral velocity variations in a fast, efficient and accurate manner. A root-mean-square (RMS) velocity function is derived from a set of seismic data samples comprising a body of seismic data. A best fit migration velocity is determined from the seismic data so as to provide a best migration. The seismic data may then be partitioned into a series of discreet frames and stretched according to a predetermined algorithm. Each partition is migrated in series by a portion of the RMS Velocity function until the data are fully migrated. After migration, the migrated seismic data are inversely stretched vertically followed by an inverse lateral stretch to remove any distortion instilled in the data by the initial data stretching.

3 Claims, 13 Drawing Sheets

Conventional Stolt

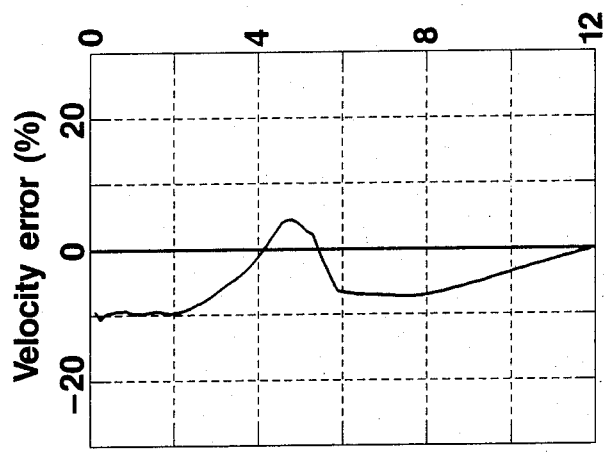
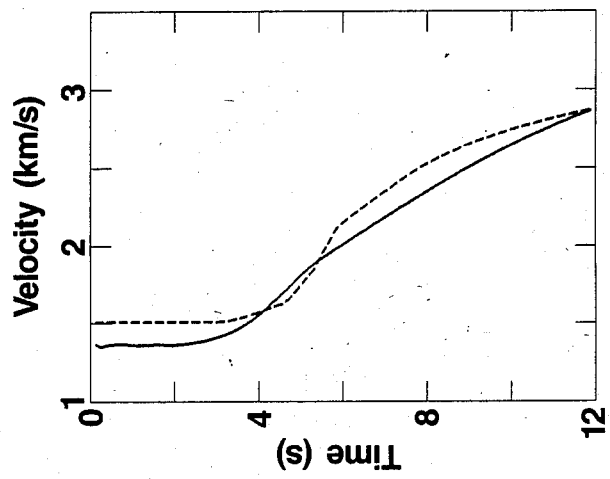
FIGURE 12b
FIGURE 12a

4-Stage Cascaded f-k

METHOD OF MIGRATING SEISMIC DATA

BACKGROUND OF THE INVENTION

This invention relates to seismic-data processing, and particularly to an improved method for migrating seismic data having steeply-dipping reflector horizons.

In reflection seismic profiling, seismic signals are generated at or near the surface of the earth. Normally these seismic signals are considered to be in the form of a compressional wave field. As the signals propagate downward into the earth they are reflected and diffracted by discontinuities in the subsurface. Some of the signals are returned upward to the surface of the earth where they are detected by suitable seismic sensors. The returned signals are usually in the form of a train of seismic waves that are received over a predetermined time interval such as 10 seconds (s).

Along the surface of the earth above a zone of interest, many sensors may be deployed along a line or grid. Each sensor is usually in the form of an electromechanical transducer which converts the detected seismic signals into corresponding electrical signals. The electrical signals generated by each sensor correspond in amplitude and phase as a function of frequency to that of the received seismic wave train. The electrical signals from each sensor are transmitted over conductors to a remote recording unit for later processing.

The recorded seismic signals do not provide a true cross-section of the subsurface. They represent only the two-way travel time of the signals generated at the surface to a reflector and back to the surface. The reflected signals reaching the surface propagate in the form of ever-expanding wave fronts. In a non-uniform medium, variations in the velocity of propagation tend to influence and modify the direction of propagation and are accompanied by mutual interference of wave fronts. In zones of sudden changes along geologic interfaces such as faults, a portion of the seismic signal undergoes diffraction. Consequently the record of the detected signals represents a distorted image of the subsurface; an image which has undergone a complicated process of focusing, de-focusing, interference and diffraction. A numerical process for correcting these propagation effects in the data is the process of migration.

By far, the majority of migrations done today still fall into the category of time migration. In routine processing of large three dimensional (3-D) seismic surveys, computational efficiency and migration accuracy, always at issue, become primary concerns. High-accuracy migration techniques, whose speed limitations were tolerable for smaller surveys, may be unacceptably slow for large 3-D seismic surveys. Thus, for 3-D imaging and other reasons there continues to be interest in improving time-migration algorithms.

Many algorithms have been proposed for time migration, each with strengths and weaknesses. Most migration methods work well when dips are moderate and velocities are well behaved. However, those that perform well for steep dips and extreme velocity gradients tend to be less efficient. Now that steep-dip-information is routinely preserved by dip-moveout (DMO) processing for both 2-D and 3-D data, migration algorithms must be able to properly image steep dips. In addition to imaging steep dips accurately, the ideal time-migration algorithm would also correctly handle vertical velocity variations, honor the associated ray bending, and be computed efficiently. Also, it must accommodate some degree of lateral velocity variation.

In all but one of these ideal traits, Stolt's frequency-wavenumber (f-k) migration would be the method of choice. It is extremely fast relative to other migration techniques and has unlimited dip accuracy. Although it is strictly valid only in the constant-velocity setting, with Stolt's stretching of data to pseudo-depth and associated modification to the wave equation, it can also handle mild velocity variations both vertically and laterally. The only disadvantage to Stolt's f-k migration technique is that, for significant vertical velocity variation and steep dips, migration errors become unacceptable.

SUMMARY OF THE INVENTION

It is an object of this invention to provide a migration technique which is extremely fast and exhibits unlimited accuracy.

It is another object of this invention to provide such a technique for seismic data having large vertical velocity variations and steeply dipping events.

There has been a long standing need in the field of seismic data processing to provide a fast and accurate method for migrating seismic data consisting of a wide variation in vertical velocity and having steeply dipping structures.

Accordingly, the instant invention provides a method for migrating seismic data in a fast and efficient manner. In addition, the inventive method will migrate seismic data having a large velocity variation and having steep events on the order of ninety degrees.

In general, the four-stage f-k migration involves generating a depth variable root-mean-squared velocity function from a set of seismic data samples comprising a body of seismic data arranged in a spatial array of two-way travel times. The seismic data may be in the form of two-dimensional or three-dimensional data. Before migrating the original seismic data may be stretched laterally according to a formula so as to provide a best fit velocity function that will best migrate the data having a laterally varying velocity. Once the data have been stretched, an inverse stretching of the data is performed using the best fit migration velocity. Following lateral stretching the seismic data are partitioned into frames which are to be migrated in series. Prior to migrating each partition, the seismic data are again stretched, then migrated using the vertical velocity function determined for that portion and then unstretched. The uppermost data partition is fully migrated during the first migration stage down to travel time marking the bottom of the partition frame. That bottom of the partition frame is considered to be the top of the data during the next migration pass. The number of migration passes are equivalent to the number of partitions selected. In most instances, four partitions are sufficient to fully migrate the data which requires less computational effort and computer time than other methods.

BRIEF DESCRIPTION OF THE DRAWING FIGURES

FIGS. 3a and 3b are an example of error analysis for conventional f-k migration with the input velocity function in FIG. 1a;

FIGS. 4a and 4b are an error analysis for a four-stage cascaded f-k migration with the input velocity function from FIG. 1a;

FIG. 12 shows conventional f-k migration with a W-factor of 0.2.

DESCRIPTION OF THE PREFERRED EMBODIMENTS OF THE INVENTION

Figure 1A:
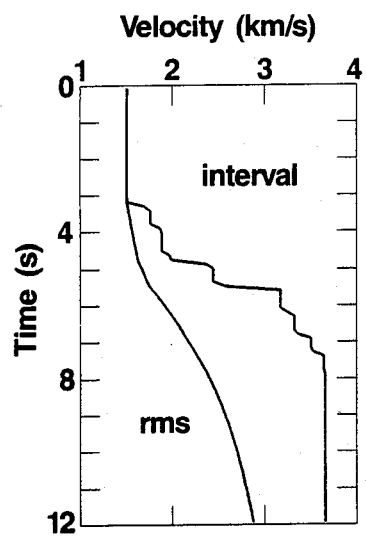
FIG. 1a illustrates RMS and interval velocity from a deepwater survey line.

As mentioned above, the instant invention is a significant improvement to the Stolt f-k migration method. The improvement is based on partitioning the velocity field, as disclosed in U.S. patent application Ser. No. 06/847,950 ('950) now U.S. Pat. No. 4,745,585 assigned to the assignee of this invention, and is incorporated herein by reference, and doing the f-k migration in stages. Using this cascading approach disclosed in the '950 patent application mentioned above, errors associated with f-k migration can be made as small as desired. In practice, these errors can be quantified and accuracy can be assured to any desired level, even in the presence of extreme vertical velocity variation.

The following description will first provide some background on Stolt's f-k migration approach and its limitations, then describe cascaded migration and the improved f-k migration approach of this invention. In addition, the invention includes a lateral velocity variation in the improved migration method. The mode of operation will be discussed in reference to synthetic and field data with vertical velocity variation.

F-K MIGRATION FOR VERTICALLY INHOMOGENEOUS MEDIA

Stolt introduced an approach to seismic data migration based on manipulations of the wavefield in the frequency-wavenumber domain. The method can be accurate for all dips, and with use of the two-dimensional (2-D) fast Fourier transformation between the space-time and f-k domains, is an efficient approach to time migration. As often happens, the efficiency of implementation is paid for at the price of extreme simplification of the problem being solved.

Migration in the f-k domain is accurate only if the propagation medium is homogeneous. The subsurface of the earth is not homogeneous; velocities almost universally vary considerably with depth. Stolt addressed this problem in his migration method by introducing a transformation of the data (stretching the time axis) to a form suitable for constant-velocity migration. The stretching from input time t to *stretch time* $t_s$ is given by the expression $$t_s^2 = \frac{2}{V_f^2} \int_0^t \sigma V_{rms}^2(\sigma) d\sigma, \tag{1}$$

where $V_{RMS}(t)$ is the root-mean-square (RMS) velocity and $V_f$ is a selected constant velocity, the so-called *frame* velocity. The stretching given by Equation (1) is designed to map the approximately hyperbolic diffraction patterns characterized by $V_{RMS}(t)$ in the original data into hyperbolic diffractions characterized by velocity $V_f$, independent of $t_s$. The mapping accomplishes the desired result only near the apexes of the diffractions. With the stretching of the time axis, the wave equation takes on a more complicated form, and likewise, the limbs of the diffraction patterns can depart significantly from the simple hyperbolic shape. As a result, the equations for migration become considerably more complicated than those for simple constant-velocity migration.

The Stolt method circumvented the full complexity of this problem (and the accompanying, required computational effort) by simplifying the form of the wave equation used for the migration. Specifically, in the equation, Stolt replaced a coefficient that is a complicated function of several parameters by a constant. This constant has been called the *W-factor* (W). This constant was justified on the basis that the coefficient occurs in a term that is relatively small. The effect of introducing the W-factor was to change the dispersion relationship from that for a constant-velocity medium such as defined by the expression, $$k_\tau^2 = \omega^2 - \frac{V_f^2 k_x^2}{4}, \tag{2}$$

to the following, $$k_\tau = \left(1 - \frac{1}{W}\right)\omega + \frac{1}{W}(\omega^2 - WV_f^2 k_x^2)^{\frac{1}{2}}, \tag{3}$$

where $\omega$ is the temporal frequency for the unmigrated data, $k_x$ is the lateral wave number, and $k_\tau$ is the temporal frequency for the migrated data.

Although, in theory the W-factor ranges from 0 to 2, Stolt suggested that W would usually range from 0.5 to 1.0. Where the velocity field is constant, the correct choice for W is unity: as can be seen in Equation (3), when W is unity the dispersion relation reduces to that shown in Equation (2), the appropriate relation for constant-velocity media. Unfortunately, for velocity functions typically encountered in practice, no single choice of W produces acceptable migration results for all reflection times and all dips. In the typical situation, with a particular choice of W-factor, events shallow in a section might be overmigrated, for example, and events deep in a section might be undermigrated. The best that one could hope to do is to select a value for W that produces acceptable accuracy for the events of greatest interest in the data.

To briefly summarize, the efficient f-k migration method of Stolt is often not sufficiently accurate for the vertically inhomogeneous media typically encountered in practice. The instant invention to be described below is designed to remove this shortcoming. Further inaccuracies of the conventional f-k migration method of Stolt will be discussed below in relation to error analysis.

RESIDUAL AND CASCADED MIGRATIONS

The view of migration as a process that can be accomplished in stages has proved useful in increasing migration accuracy and efficiency. Residual migration, first discussed by Rocca and Salvador at the 52nd Annual International Society Exploration Geophysics Meeting in October of 1982, and later by Rothman et al. in *Geophysics*, Vol. 50, pgs. 110-126, is an efficient two-stage method that increases the accuracy of the migration process. In the first stage, migration is done with a constant velocity $V_c$. The migrated data are then migrated a second time with a residual interval velocity function $V_r(t)$ given by the expression $$V_r^2(t) = V^2(t) - V_c^2 \qquad (4)$$

The result of this two-stage process is equivalent to a conventional migration done with interval velocity V(t). As an example of the benefit of this approach, Rothman et al. suggest that the first constant-velocity migration can be done with a fast and accurate algorithm (e.g. f-k migration) and that the second migration can be done with a method that can accommodate velocity variations. The algorithm used for the second stage can take advantage of the reduced residual velocity to lessen computational effort; finite-difference migration for example described in U.S. patent application Ser. No. 06/847,950 mention above could make use of large depth steps, and Kirchhoff migration could be done with a relatively small aperture. Moreover the use of the reduced velocity field improves the accuracy of finite-difference migration.

In finite-difference migration disclosed in U.S. Pat. No. '950, the migration process is divided into n stages, with the output migrated data from any stage serving as the input to the next stage. The larger the number of migration stages, the smaller becomes the velocity used in each stage. This follows from the requirement that the interval velocities $V_j(t)$, where j=1,2, . . . , n, used for the j-stages satisfies the expression $$V^2(t) = \sum_{l}^{n} V_j^2(t), \qquad (5)$$

where V (t) is the actual interval velocity. Since the migration velocities in each stage can be reduced to a small fraction of V, the apparent dip perceived during each migration stage can be lowered to a value that can be treated accurately by a 15 degree finite-difference migration algorithm. As shown in U.S. patent application Ser. No. '950, a 20-stage cascade of migrations with a 15 degree algorithm can yield accurate results for events having a 65 degree dip. The patent application also shows that for the cascaded-migration scheme to operate correctly, the velocity function used for any given stage must be constant for all times later than a threshold time for that stage. Prior to that threshold time the velocity function is that required to complete the migration process as given by Equation (5).

Each stage of the cascaded migration process accomplishes a part of the total migration. After any stage, m, of the n-stage migration, the data appear as if migrated with an effective, or cumulative, interval velocity function $C_m(t)$ given by the expression $$C_m^2(t) = \sum_{l}^{m} V_j^2(t) \qquad (6)$$

For m=n, $C_m(t)$ is the true interval velocity, V(t).

The '950 patent application shows that not only is the migration error reduced within each stage, but also the cumulative error after all the migration stages is substantially reduced as well. Moreover, since the extrapolation-operator accuracy improves as the number of stages increases, cascadedfinite difference migration progressively better honors the ray bending (i.e., the refraction of rays across interfaces) that occurs in a horizontally layered medium.

CASCADED F-K MIGRATION

The following discussion is directed to one embodiment of the instant invention. The above discussion provided a brief tutorial in order to fully understand and appreciate the heretofore unrecognized method.

Both the residual migration and cascaded finite-difference migration techniques take advantage of the reduced velocity within each stage to compensate for weaknesses in the algorithm. Frequency-wavenumber or f-k migration, similarly done in stages, also benefits from reduced velocities, but for different reasons. Partitioning the velocity field not only reduces the velocity within each stage, it also restricts its vertical variation. Thus, for each stage, the migration-velocity field is closer to being constant than is the true velocity field. As a result, at each stage (which consists of data stretching, constant-velocity migration, and unstretching of the data) the proper W-factor is closer to 1.0 (the correct value for constant-velocity migration), thus reducing migration errors caused by the W-factor approximation.

Figure 1C:
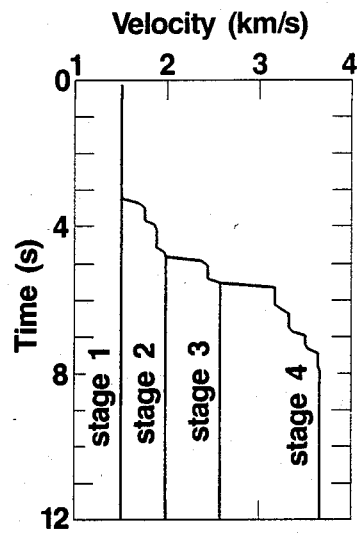
FIG. 1c illustrates the cumulative interval velocity for each stage of a four-stage migration.
Figure 1B:
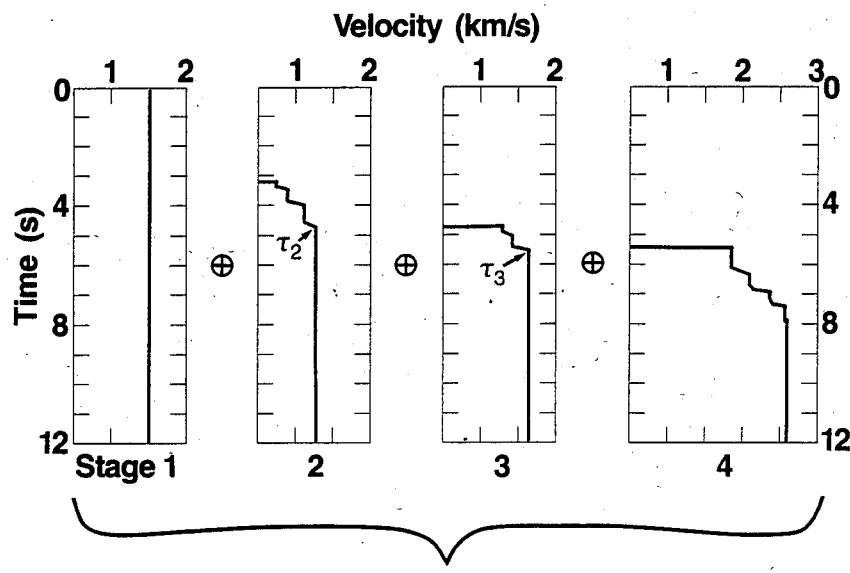
FIG. 1b illustrates interval velocity for each stage of a four-stage migration.

Recall from Equation (6) that after the m-th stage of migration the data appear as though they had been migrated with the cumulative interval velocity $C_m(t)$. FIGS. 1a-1c exemplify the building of the cumulative velocity field for a four-stage migration. FIG. 1a shows the input RMS and associated interval-velocity functions from a deep-water seismic section. The interval velocities for each stage of the four-stage migration process are shown in FIG. 1b, and the resulting cumulative interval velocity after each stage of migration is shown in FIG. 1c.

The velocity for the first stage of migration in this example is constant since the migration is from the water surface to the ocean bottom. Hence, for this stage, we have the ideal condition for f-k migration and can expect a perfect migration with use of a W-factor of 1.0. After the first migration, the data are completely migrated down to the water-bottom reflection time of about 3.4 seconds (sec). The second stage of migration begins at 3.4 sec (threshold time of $\tau_1$) and theoretically requires a velocity of zero at this time. The interval velocity for this stage increases rapidly to its maximum value $V_1$ at a threshold time of $\tau_2$ (about 4.8 sec). One might expect such a large variation in velocity over such a small time interval to cause large errors in the f-k migration for this stage. Recall, however, that the input data for this stage have already been partially migrated. Moreover, those data that require only low residual migration velocity are already almost fully migrated (i.e., any diffractions are almost fully collapsed). Therefore, stretching of the time axis, which would severely distort fully unmigrated diffractions, does negligible harm to the residual migration. Below $V_1$, the interval velocity is constant, and the RMS velocity (not shown) asymptotically approaches it. Because the RMS velocity is not perfectly constant, a W-factor of slightly less than 1.0, say for example 0.8 or 0.9, is appropriate for this stage. The process continues in a similar fashion for the third and fourth stages. The migrations for these stages begin at $V_1$ and $V_2$ respectively, with small interval velocities that increase rapidly to their maximum value.

One of the most difficult problems for conventional single-stage f-k migration is that of imaging steep, shallow structures. This problem arises because reflections from such structures arrive late and are thus particularly susceptible to travel time distortions caused by stretching the data prior to migration. Such shallow structures can be imaged properly with a single-stage f-k migration by a judicious choice of a W-factor, but as has been pointed out, only at the expense of possibly degrading the migrated image elsewhere in the section. Since the waves associated with these events travel through only the upper part of the section, the events are best imaged when migrated with a near-surface, substantially constant velocity function. It is preferred for the inventive improvement of the f-k migration process.

As with cascading finite-difference migrations, the accuracy of cascaded f-k migration increases with an increasing number of migration stages. In principle, both approaches become equivalent to phase-shift migration as the number of stages is increased. The phase-shift approach is actually another f-k domain method of migration accurate for all dips up to 90 degrees in a vertically varying velocity field. For cascaded finite-difference migration this equivalency is met only as the number of stages approaches infinity. For cascaded f-k migration, equivalency is achieved more easily. U.S. patent application Ser. No. '950 illustrates that when any number of phase-shift migrations are cascaded using velocity functions that satisfy Equation (5), the result is equivalent to a single phase-shift migration done with the true velocity. Since for constant velocity, an f-k migration is equivalent to a phase-shift migration, cascaded f-k migration becomes identical to phase-shift migration when one stage of migration is done for each constant-velocity layer of a horizontally stratified velocity field. While as many as twenty or more stages of cascaded finite-difference migration are required to accurately migrate dips as large as 65 degrees, for any realistic velocity function only four stages are required in cascaded f-k migration to produce images virtually indistinguishable from those obtained by phase-shift migration.

In conventional f-k migration, the W-factor can be chosen so as to best image or position particular events. Unfortunately, as mentioned above, optimizing the migration for one event generally results in degradation of other events. The migration error associated with a particular choice of W-factor is a complicated function of velocity, dip, and time. Here is derived a technique to quantify this migration error for both conventional and cascaded f-k migration.

Consider a stratified earth model in which point scatterers are evenly spaced in time from top to bottom. The zero-offset response of this model would consist of a number of diffractions whose travel-time trajectories are governed by the interval velocity field. These travel-time trajectories define ideal migration-summation trajectories. A Kirchhoff migration, for example, that sums along these trajectories perfectly collapses the energy in the diffractions to the proper positions.

The accuracy of Stolt's f-k approach can be assessed by how well the summation trajectories implied by the f-k method match the actual diffraction travel-time trajectories. Through the use of stationary-phase analysis, the migration-summation path, in stretched time, implied by Equation (3) is defined by the expression $$t = \left(1 - \frac{1}{W}\right)t_o + \frac{1}{W}\left(t_o^2 + \frac{4Wx^2}{V_f^2}\right)^{\frac{1}{2}}, \quad (7)$$

where $t_o$ is the apex time of the diffraction curve, x is the lateral distance from the apex position, and $V_f$ is the frame velocity. Note that for a W-factor equal to 1, the travel-time equation becomes identical to that in a constant-velocity medium.

The f-k summation trajectories given by Equation (7) are in stretched time. The actual diffraction patterns, on the other hand, are computed via ray tracing in original unstretched time. Thus, to compare the f-k trajectories with the actual ones, we must map one of them into the time-coordinate system of the other, using the time-axis mapping as defined by Equation (1). Comparisons of travel-time trajectories then become independent of the choice of frame velocity and thus, for a particular velocity function, we need consider only the effects associated with different choices of W.

Figure 2:
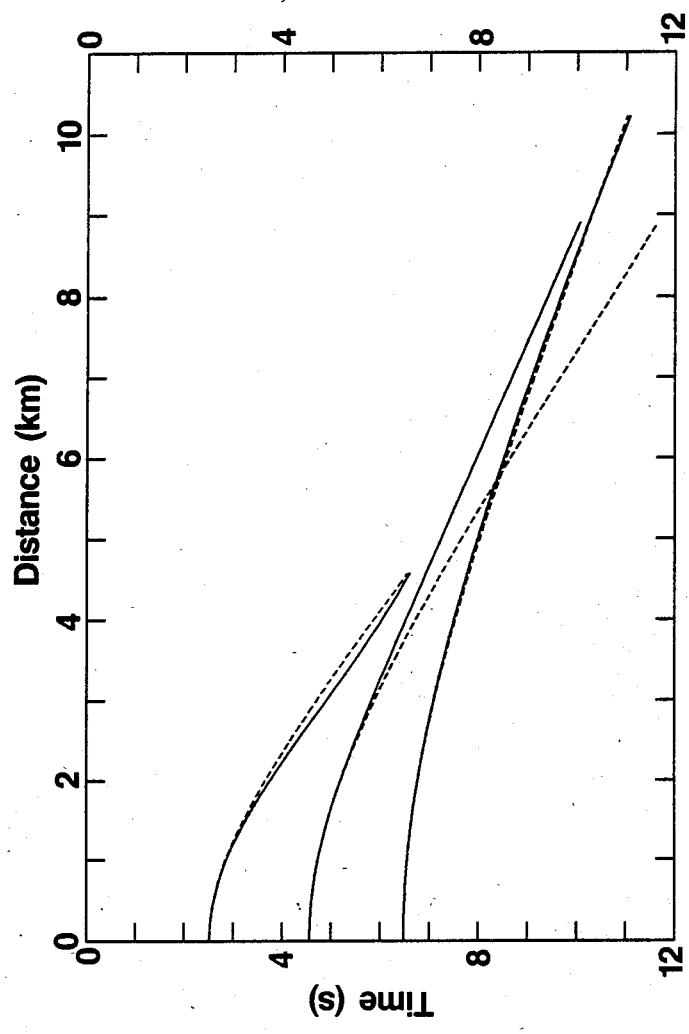
FIG. 2 is an example of actual diffraction patterns determined with ray tracing and f-k migration trajectories for a W-factor of 0.5 and for point scatterers at 2.5, 4.5, and 6.5 sec.

FIG. 2 shows actual (dashed) and f-k (solid) summation trajectories, in unstretched time, for a W-factor of 0.5 and the RMS velocity function shown in FIG. 1a. The trajectory distances in this example are limited by a maximum time-dip of 1.2 milliseconds per meter (ms/m) and a maximum recording time of 12 sec. The extent to which the corresponding trajectories match gives some measure of the expected accuracy of the migration. For small dips nears the apexes, the pairs of trajectories match well for all three point-scatterers. Over steeper portions, the f-k summation trajectories deviate from the actual trajectories, but not necessarily in a consistent manner. For the trajectory with apex at 2.5 sec, the f-k trajectory exhibits generally larger moveout than does the actual trajectory. As a result of the inability of the stretch function to map perfectly to constant velocity, this f-k trajectory is distinctly non-hyperbolic, actually changing from concave down to concave up at an offset distance of about 3000 meters. The f-k trajectory with apex at 4.5 sec shows just the opposite behavior, indicating a faster velocity than that associated with the actual diffraction curve. Finally, the f-k trajectory with apex at 6.5 sec agrees well with the actual trajectory over its entire length. Hence, based on these observations it would be expected that an f-k migration with this choice of W-factor will tend to undermigrate events around 2.5 sec, overmigrate events around 4.5 sec, and properly migrate events around 6.5 sec.

An approximate, but concise and convenient representation of the migration error is the percent difference between the velocities that define the hyperbolas that best-fit the two trajectories in a least-squares sense. Unfortunately, when so characterized, the dip-dependence of the migration error becomes somewhat obscured; the simplification, nevertheless, gives a useful single measure of the error.

Figure 3B:
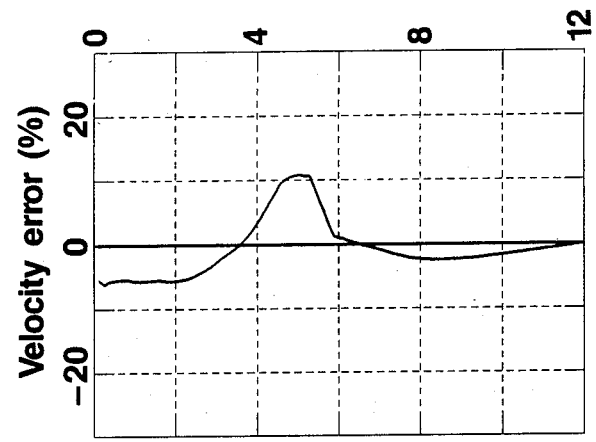
Figure 3A:
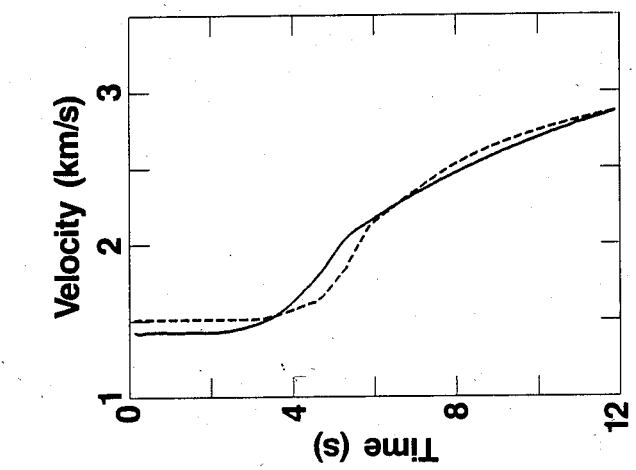

FIG. 3a shows the "best-fit" velocities for the f-k migration-summation trajectories ($V_{f-k}$) and those for the raytraced diffraction patterns governed by the velocity function in FIG. 1a ($V_{actual}$). The relative shapes of the two curves confirm the qualitative assessment based on the travel time trajectories in FIG. 2: events that migrate to positions earlier than 3 sec will tend to be undermigrated, events that migrate to times between 3 and 6 sec will tend to be overmigrated, and events that migrate to times between 6 and 7 sec will generally be properly migrated.

The percent difference, or error, between the best-fit velocities is defined by the expression $$\text{pct error} = \frac{100(V_{f-k} - V_{actual})}{V_{actual}} \qquad (8)$$

A positive error implies overmigration such as when too large a velocity is used in migration, whereas a negative error implies undermigration. The velocity-error plot corresponding to the velocity curves in FIG. 3a is shown in FIG. 3b.

The error analysis for the cascaded f-k method proceeds much the same as that for conventional f-k migration. Now however, best-fit velocities are computed for each migration stage, converted to interval velocities, and then accumulated using Equation (6). After all n stages, these cumulative interval velocities are converted back to RMS velocities, which are defined as the best-fit velocities for the cascaded f-k process. These best-fit velocities are then compared, just as with the conventional f-k method.

Figure 4B:
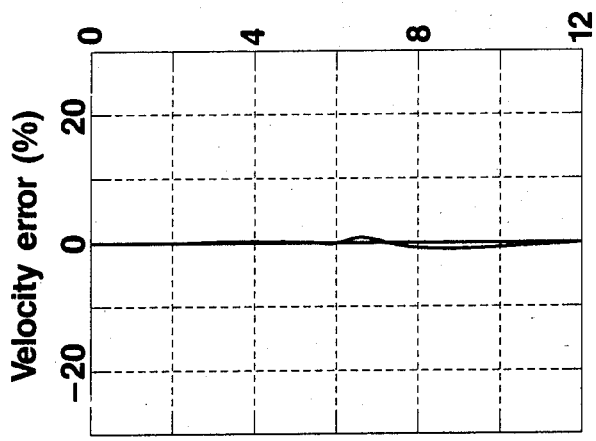
Figure 4A:
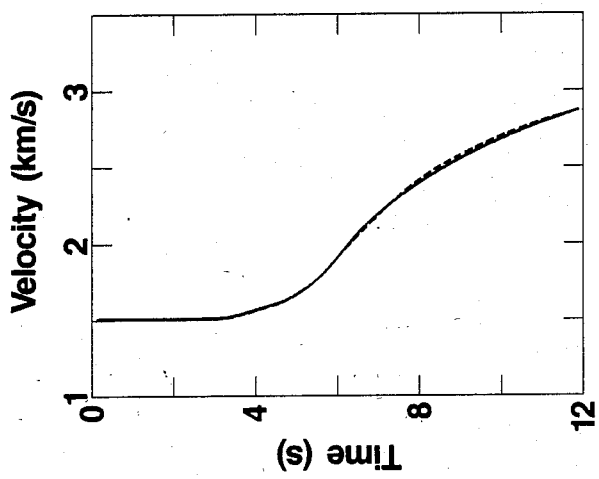

The best-fit velocities and the corresponding velocity error for the four-stage migration example of FIG. 1 are shown in FIGS. 4a and 4b. The two velocity functions in FIG. 4a are nearly identical: the maximum error in FIG. 4b is no more than 1 percent, implying that such a migration will be considerably more accurate than conventional f-k migration as shown in FIG. 3.

The above type of error analysis can be used to determine the number of stages necessary to reduce the migration-velocity error to some specified threshold such as 1 percent. Also, error analyses for trial studies with a broad range of velocity functions suggest appropriate choices for the velocities and W-factors for each stage. In practice, the choice of number of stages can be estimated well using the maximum time-dip in the unmigrated data. If, for example the data contain only gently dipping events, single-stage conventional migration will be adequate. For increasing dip, the number of stages required to maintain accuracy increases. Error analyses performed on a wide range of velocity functions encountered in practice, however indicate that four stages of the f-k algorithm are adequate to achieve the level of accuracy of phase-shift migration.

Up to this point, the discussion has centered on the improved accuracy that can be obtained by applying the improved f-k migration in stages wherever velocity is depth-dependent. In practice, velocities vary laterally as well as vertically. Strictly, in such situations migration should be performed as depth migration. Where the lateral variation is sufficiently mild, time migration can be an effective imaging tool and because it is more efficient, less dependent on detailed velocity information, and generally less sensitive to velocity error than depth migration, it continues to be much more commonly used.

No form of time migration is truly correct when velocity varies laterally; moreover, each of the various time-migration algorithms performs differently in the presence of such variation. The action of f-k method, however differs most from that of all the other approaches when velocity varies laterally. This is so because of the stretching of the time axis that is required in the f-k approach. More particularly, the action differs because of the differential stretching associated with lateral changes in the velocity field.

The differential stretching alters the apparent dip of all features in the unmigrated data. In the conversion to stretched time (Equation 1), portions of data in regions of relatively high velocity are stretched to later times relative to portions where velocity is relatively low. Consequently, for example, a reflection that is horizontal in the original data dips downward in the direction of increasing velocity after the stretching. Perceiving an apparent dip for the originally horizontal reflection, the f-k algorithm migrates the event in the apparent up-dip direction. After the imaging step, quite apart from the conversion back to unstretched time, the final position of the event is displaced laterally in the direction of the decreasing velocity relative to where it would have been if stretching had not been done. This relative direction of lateral displacement is independent of the original dip of the event.

This conclusion holds for any time-migration approach that might be used for the imaging step. That is, one might well choose to do the stretching in conjunction with finite-difference or Kirchhoff-summation migration. For the f-k approach, the stretching step is not a matter of choice; it is a necessity in order to accommodate velocity variation.

These differences in lateral migration caused by the stretching step suggest an important question: which is more nearly correct in time migration—to stretch or not to stretch? This question is not easily answered. As mentioned above, where velocity varies laterally, no form of time migration is strictly correct. One can readily model common situations where the action of including the stretching step, as opposed to not including it, is to position events in the direction that would be indicated by ray-theoretical depth migration. Unfortunately, counter-examples can be devised as well. Moreover, even where the direction of movement is correct, accuracy in the positioning would be fortuitous.

Certainly, accuracy in imaging by time migration depends upon the accuracy of the velocity field used for the migration. Also, as is well known, conversions from time to depth are even more sensitive than time migration to velocity errors. The sensitivity of f-k migration, with its data-stretching, to velocity errors is between the two. Thus, although the f-k approach can tolerate some lateral velocity variation, the velocity field must be smooth to minimize positioning errors associated with anomalous velocity behavior.

Since the cascaded f-k approach of this invention uses data-stretching just as does the conventional f-k approach, the above discussion applies equally to both. However, since in the cascaded approach a different stretching is done before each migration stage and is undone afterward, care is required to avoid compounding of problems associated with lateral variation. Specifically, compounding of the problems can be avoided by preceding the entire cascaded process with a laterally variable stretching that modifies the data so that they are best migrated with a velocity function that depends only on depth or, equivalently, vertical time. To accomplish this, first an RMS velocity function $V'(t)$ representing the vertical velocity variation (e.g. $V'(t)$ could be chosen as the spatial average of all velocity functions) is chosen. The seismic data are then stretched according to Equation (1) in which $V_{RMS}(t)$ is the local, spatially-varying velocity. An inverse stretch is then applied again using Equation (1), but now with $V_{RMS}(t) = V'(t)$. Cascaded f-k migration then proceeds using the spatially invariant velocity function $V'(t)$. Following the last stage, the above procedure is reversed to restore the laterally varying velocity structure to the seismic data. With this scheme, the cascaded f-k migration approach in general fares no better nor worse than the conventional f-k approach in the presence of lateral velocity variation.

Figure 5:
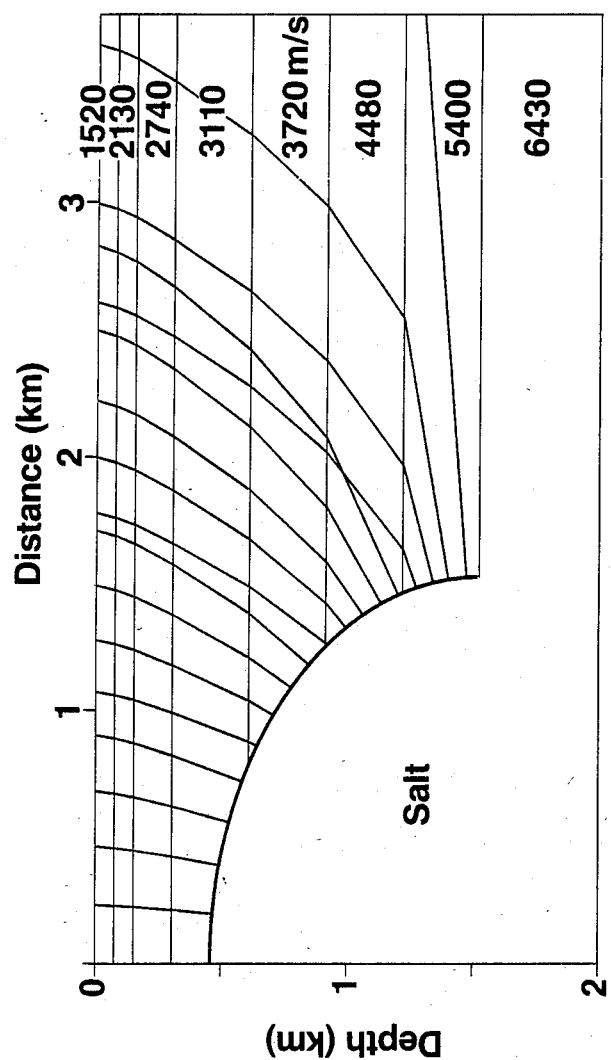
FIG. 5 is a velocity-depth model depicting a curved saltdome boundary under a stratified section with a large vertical velocity gradient.
Figure 6:
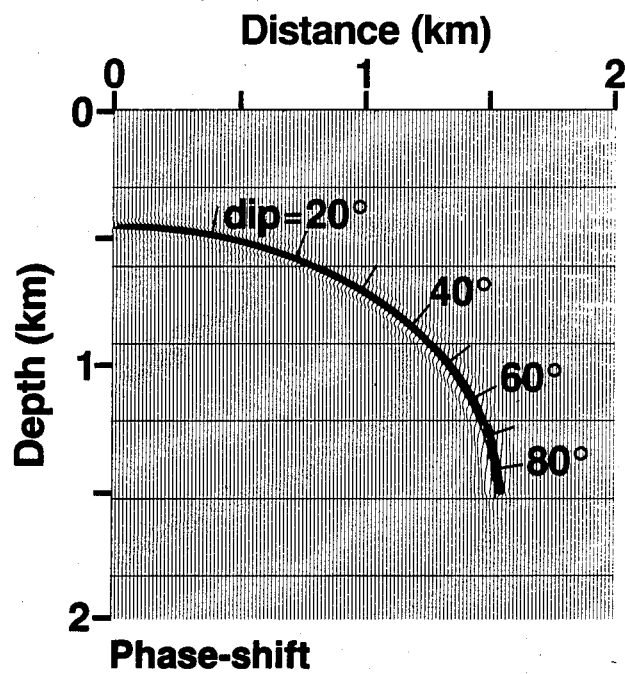
FIG. 6 illustrates phase-shift migration of synthetic zero-offset data for the model of FIG. 5.

To illustrate the operational effectiveness of the instant method, consider the velocity-depth model shown in FIG. 5. The model represents a salt mass embedded in a stratified medium consisting of homogeneous, isotropic layers. The interval velocity function in this model increases rapidly with depth through the layered sequence, beginning at 1500 meters per second (m/s) at the surface and increasing to over 6400 m/s at 1500 meters (m). This model poses a severe challenge for a migration technique on two counts: (1) the vertical portion of the modeled salt structure requires that dips up to 90 degrees be properly migrated and (2) the migration must accommodate substantial ray bending to obtain an accurate image. Because reflections from the salt boundary travel through only the stratified section, the two issues pose no problem for the migration of steep events by the phase-shift method; the results of the phase-shift method as shown in FIG. 6 will be used as a benchmark to judge the quality of a standard migration method. The phase-shift migration result overlays the line that denotes the correctly imaged salt flank. Note that the section in FIG. 6 is displayed in depth, with no vertical exaggeration.

Figures 7A, 7B:
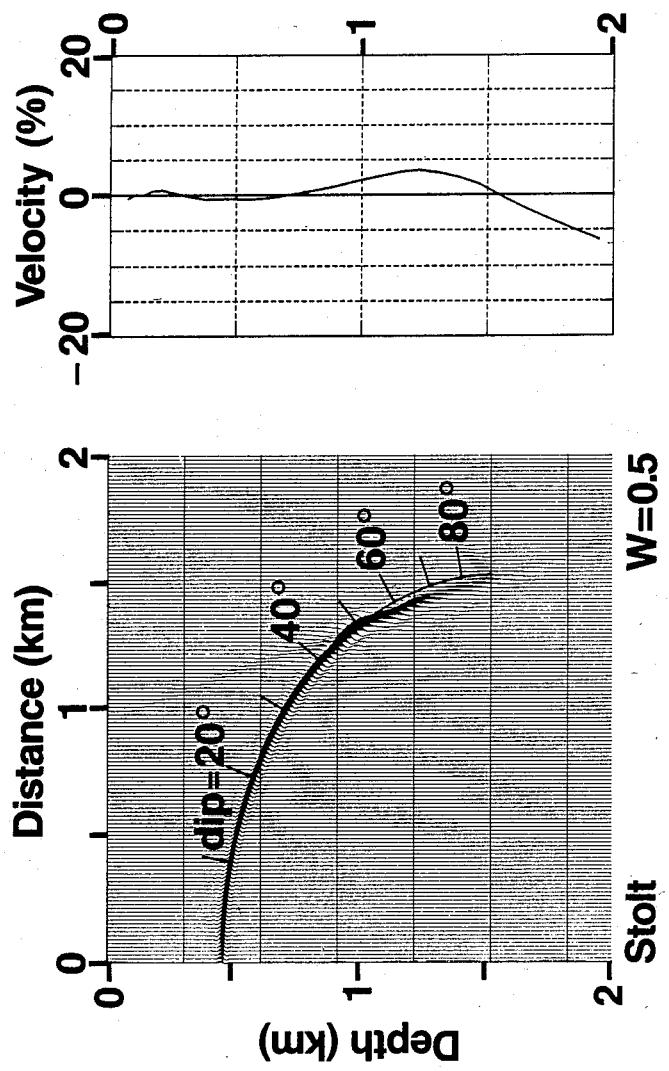
FIG. 7a illustrates a conventional f-k migration with a W-factor of 0.5.
FIG. 7b is an example of implied migration-velocity error.

FIG. 7 shows the result of a conventional Stolt f-k migration and the implied migration-velocity error caused by the inability of the algorithm to adequately perform with the large vertical velocity variation. The image is accurately migrated down to 0.7 kilometers (km), below which it becomes progressively overmigrated down to roughly 1.25 km. The error curve indicates that events at 1.25 km have, in effect, been migrated with a velocity that is nearly 4 percent (%) too large. Below 1.25 km, the velocity difference decreases, becoming negative below 1.5 km. The W-factor used here was 0.5. Increasing or decreasing its value basically only changes the bias in the velocity error curve; the error can be decreased at one depth only at the expense of increasing the error at other depths.

Figures 8A, 8B:
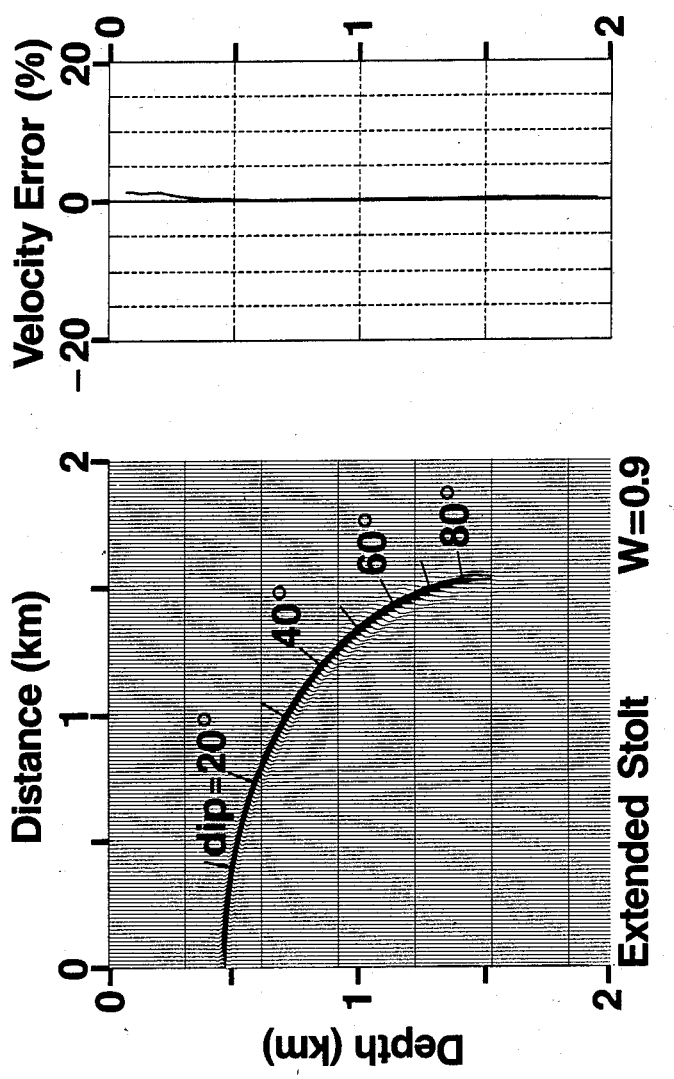
FIG. 8a is an example of a four-stage cascaded f-k migration with a W-factor of 0.9.
FIG. 8b is an example of implied migration-velocity error.

The result of a four-stage, cascaded f-k migration of the instant method is shown in FIG. 8a. This section is nearly indistinguishable from the phase-shift migration of FIG. 6, but required significantly less computation effort. The accuracy of the instant method is supported by a less than one percent implied velocity error. See FIG. 8b.

Figure 9:
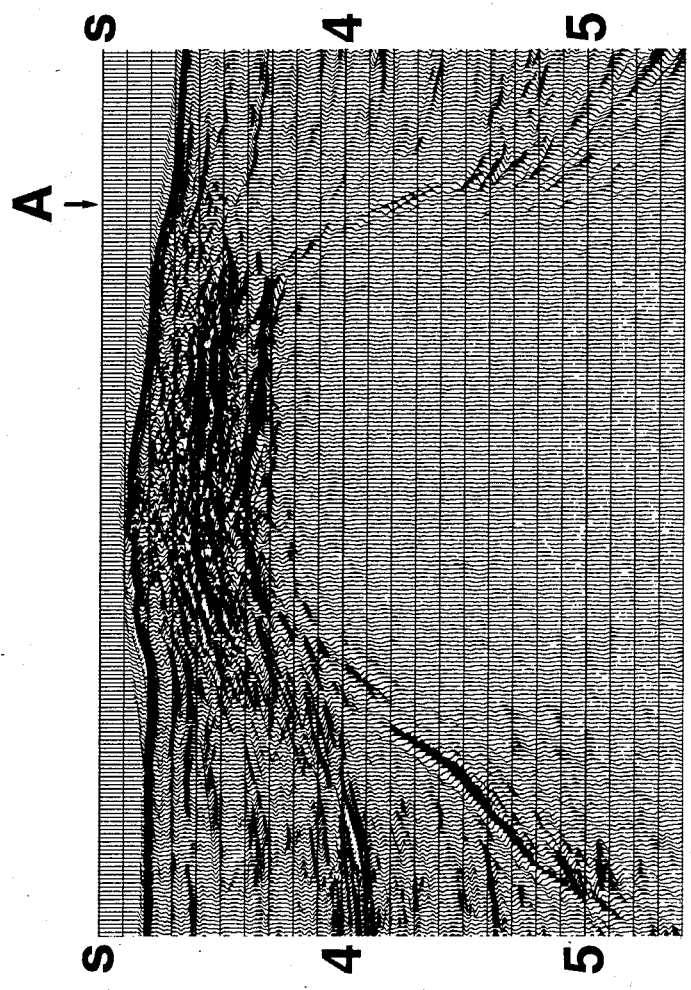
FIG. 9 shows phase-shift migration of field data.
Figure 10:
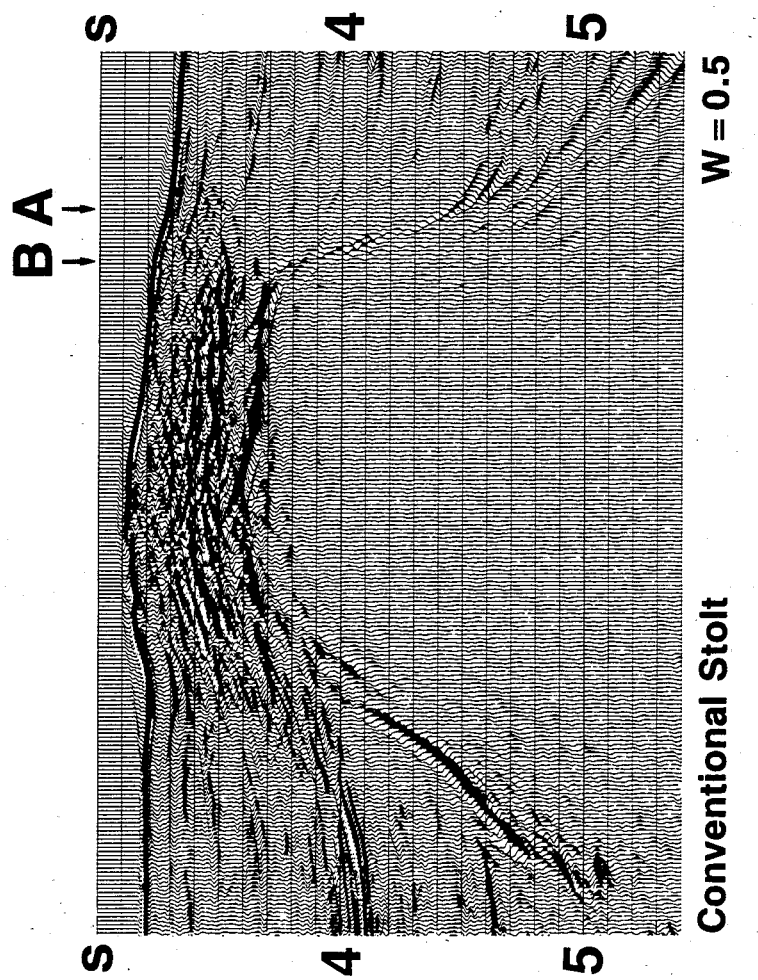
FIG. 10 shows conventional f-k migration of the same structure with a W-factor of 0.5.

FIG. 9 illustrates a phase-shift migration of marine data. The migration velocity, which is the same as in FIG. 1a, is held constant laterally so as to use the phase-shift migration result to judge the results of the f-k migrations. Although the section is deep with the water bottom below 3 sec, it still exhibits images of steep salt flanks (see midpoint A around 4.3 sec) that are considerably earlier than the unmigrated reflection times from 8 to 10 sec. These unmigrated events are particularly susceptible to the distortions caused by data-stretching. In fact, both the f-k migration-summation trajectory with apex at 4.5 sec shown in FIG. 2 and the velocity-error curves of FIG. 3 show that these events would be considerably overmigrated if the commonly used value for W of 0.5 were used in a conventional f-k migration. This is confirmed in FIG. 10. The salt flank has been overmigrated beyond its true position to midpoint B and crosses the reflection associated with the top of the salt.

Figure 11:
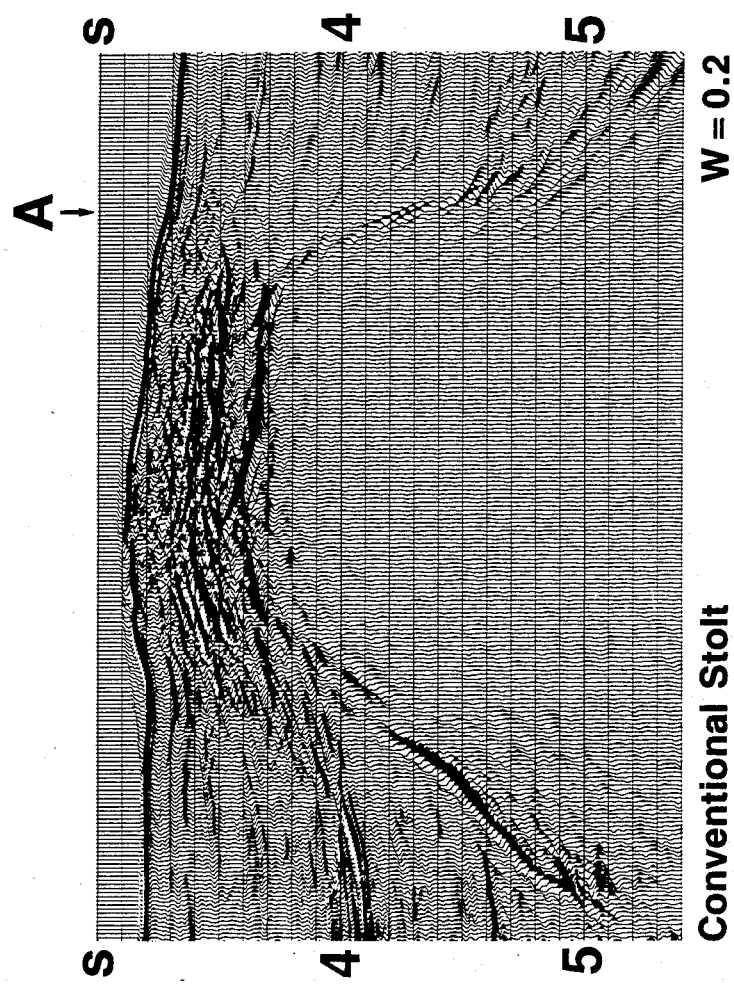
FIG. 11 shows the error analysis when a standard velocity function is used for a conventional f-k migration with a W-factor of 0.2.

Error analysis for conventional f-k migration allows us to determine if it is possible to image the salt flank better with use of a different choice for W. By examining the velocity-error curves for a suite of possible W-factors, the reduction of W to 0.2 reduces the best-fit f-k velocity such that in the region of 4 sec, the migration-velocity error is only a few percent. See FIG. 11. The result of migration with a W-factor of 0.2, shown in FIG. 12, does show considerable improvement in the image of the salt flank. The consequence, however is that migration-error problems have been moved elsewhere. This may or may not be acceptable depending on the dip of the events in those other areas of the section. Above 3 sec for example, data would be grossly undermigrated; in this data case however, this is not a problem since there are no events above the water bottom around 3 sec. Fortunately, use of cascaded f-k migration obviates the need to choose an optimal W-factor and thus avoids possible compromises in accuracy.

Figure 13:
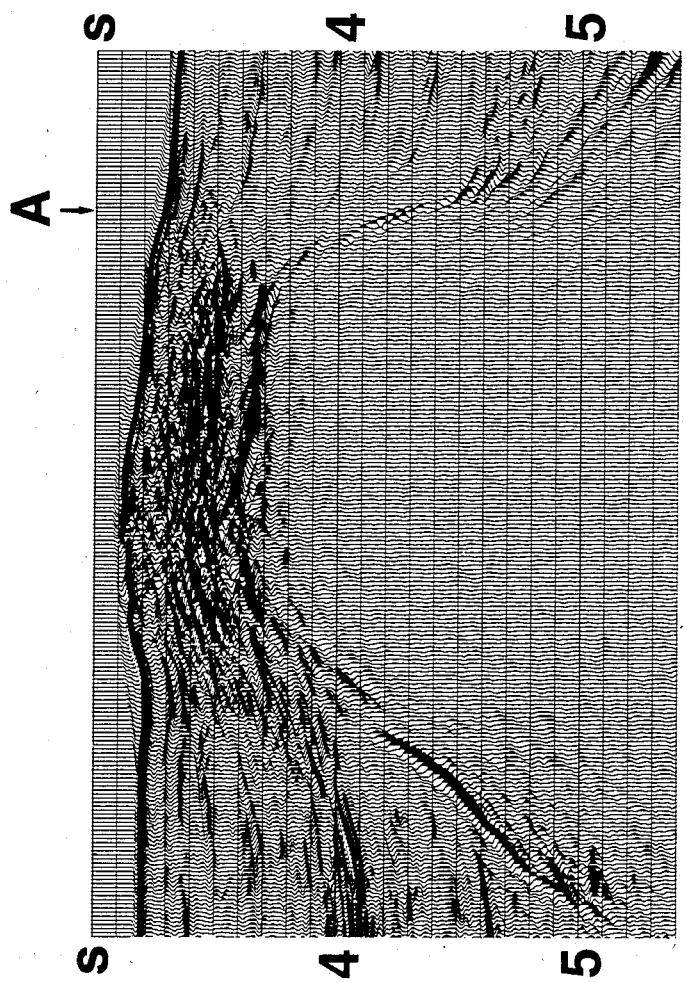
FIG. 13 shows a four-stage cascaded f-k migration substantially identical to the phase-shift result in FIG. 9.

The result of the inventive four-stage cascaded f-k migration is shown in FIG. 13. It is virtually identical to the result of phase-shift migration shown in FIG. 9. This confirms expectations based on the velocity-error curve shown in FIG. 4. Not only is the flank well imaged, but so is the entire section rather that just one zone, as in the conventional f-k migration with a W-factor of 0.2. See FIG. 12.

3-D MIGRATION

The practical benefit gained from doing f-k migration in stages is that in the presence of vertical velocity variations, steep-event accuracy is significantly improved for an algorithm that is unrivalled for computational speed. Considering the large volumes of data, particularly three-dimensional (3-D) data, that are being migrated commonly today, the combination of high accuracy and high performance takes on particular importance. One can ill afford the cost associated with learning that the result of a 3-D migration effort suffers from inaccuracy due to improper choice of processing parameters. Not only does cascaded f-k migration offer an advantage in accuracy over that of conventional f-k migration, it removes the dependence of results on the choice for an esoteric parameter, the W-factor.

Much has been said about the comparative speed and accuracy of doing full 3-D migration in a single pass and that of doing the 3-D migration in two passes of 2-D migration, applied to a line of data at a time. It has been shown that for a homogeneous medium, when an accurate migration algorithm is used, the two-pass approach yields the same accuracy as the more computationally intensive, single-pass approach. It has also been shown that where velocity increases with depth, the two-pass approach looses accuracy for events that dip along azimuths away from the directions along which the two passes of 2-D migration were performed. The error is largest near the 45 degree azimuth and that for velocity functions encountered in practice the error typically is insignificant for dips less than about 50 degrees.

Similarly, because of the dip-dependent nature of the approximations made to the wave equation in time-stretched space, the dependence of f-k migration results on the choice of W-factor are compounded when 3-D migration is done in two passes. That is, for vertically varying velocity, two-pass 3-D migration by the conventional f-k method imposes additional errors over and above those associated with two-pass migration with other algorithms. In contrast, because it removes virtually all errors associated with vertical velocity variation in 2-D migration, the cascaded f-k method does not suffer from any compounding of problems when used in two-pass 3-D migration.

For illustrative purposes, my invention has been described with a certain degree of specificity. Variations will occur to those skilled in the art but which may be included within the scope and spirit of this invention which is limited only by the appended claims.

I claim:

1. An improved method for migrating seismic data, comprising the steps of:
   (a) generating a root-mean-squared (RMS) velocity function from said seismic data, the RMS velocity function having a maximum velocity and being substantially identical to a velocity function required to migrate the seismic data in a single stage;
   (b) partitioning the RMS velocity function into a predetermined number of velocity intervals, the number of intervals being a function of a number of migration stages contemplated in migrating the seismic data, each velocity interval having a threshold velocity and a minor velocity function representing a portion of the RMS velocity function;
   (c) vertically and spatially stretching said seismic data within each velocity interval according to the expression $$t_s^2 = \frac{2}{V_f^2} \int_0^t \sigma V_{RMS}^2(\sigma) d\sigma$$

where $V_{RMS}(t)$ is the RMS velocity, $V_f$ is a constant velocity, $t_s$ is the stretch time, and $\sigma$ is a variable of integration;
   (d) migrating the seismic data a plurality of times, each time using the minor velocity function from the uppermost velocity interval which is incompletely migrated until each velocity interval is fully migrated;
   (e) unstretching said seismic data within each fully migrated velocity interval according to the expression given in step (c) whereby the sequence of unstretching is accomplished in reverse and inverse sequence to that set forth; and
   (f) repeating steps (c) through (f) for each migration stage using output from a previous migration stage as input for a subsequent migration stage.

2. A method for migrating seismic data, comprising the steps of:
   (a) generating a root-mean-square (RM) velocity function from seismic data samples of a body of seismic data arranged in an array or seismic-wave travel times as a function of spatial distribution, said RMS velocity function being limited by a maximum velocity observed at a greater travel time of interest and which best approaches a velocity function required to migrate the seismic data in a single stage;
   (b) partitioning the RMS velocity function into a series of RMS velocity sub-functions in a manner such that the associated interval velocities satisfy the expression $$V^2(t) = \sum_j V_j^2(t)$$

where $V_j$ is the interval velocity, V is the RMS velocity, and t is time;
   (c) stretching the original seismic data from time t to stretch time $t_s$ according to the expression $$t_s^2 = \frac{2}{V_f^2} \int_0^t \sigma V_{RMS}^2(\sigma) d\sigma$$

where $V_{RMS}(t)$ is the root-mean-square velocity, $V_f$ is a selected constant frame velocity, $\sigma$ is a variable of integration, and $t_s$ is the stretch time;
   (d) migrating the stretched seismic data using the RMS velocity sub-function from the uppermost incompletely migrated partition;
   (e) unstretching the migrated seismic data according to expression in step (c) in reverse and inverse sequence; and
   (f) repeating steps (c) through (e) for each velocity partition using the output from the previous migration stage as the input for the subsequent migration stage.

3. A method of migrating seismic data, comprising the steps of:
   (a) generating a single root-mean-square (RMS) velocity function from original seismic data samples of a body of seismic data arranged in an array of seismic-wave travel times as a function of spatial distribution which best represents the actual spatially varying RMS velocity derived;
   (b) stretching the seismic data laterally so that the seismic data are best migrated with a vertical-time dependent velocity function according to the expression $$t_s^2 = \frac{2}{V_f^2} \int_0^t \sigma V_{RMS}^2(\sigma) d(\sigma)$$

where $V_{RMS}(t)$ is the local, depth and spatially-varying velocity;
   (c) unstretching the seismic data according to the expression given in step (b) where $V_{RMS}$ is equal to the RMS velocity function of step (a);

(d) partitioning the RMS velocity function into a series of discreet frames;

(e) vertically stretching the seismic data according to the expression where $V_{RMS}(t)$ is the RMS velocity and $V_f$ is a selected substantially constant frame velocity, $\sigma$ is an integration variable, and $t_s$ is the stretch time;

(f) migrating said RMS velocity function by said substantially constant frame velocity; and (g) inversely stretching the migrated seismic data by reversing the procedure described in steps (b) and (c).

* * * * *